Patented July 27, 1948

2,445,925

UNITED STATES PATENT OFFICE 2,445,925

ACRYLIC ESTERS OF SECONDARY ALCOHOLS

Chessie E. Rehberg, Glenside, and Charles H. Fisher, Abington, Pa., assignors to the United States of America as represented by the Secretary of Agriculture No Drawing. Application July 7, 1944, Serial No. 543,933

11 Claims. (Cl. 260—486)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to new and useful esters of acrylic and substituted acrylic acids and methods for their preparation. More particularly, it relates to such esters wherein the acid is esterified with a secondary alcohol.

An object of the present invention is to provide new esters of acrylic acids. By "acrylic acids" or esters thereof, we mean acrylic acid itself and alpha-substituted acrylic acids, such as methacrylic, ethacrylic, chloroacrylic and similar acids. A further object is to provide new and improved resins and polymers of the acrylic type. A further object is to provide practical and economical methods for the preparation of acrylic esters of secondary alcohols and of polymers and copolymers of such esters. Other objects and advantages of the invention will appear from the following description.

The alcoholysis method of preparing acrylic esters from lower-boiling acrylates is well known. However, secondary alcohols, as distinguished from primary alcohols, are generally regarded as being too sluggish or chemically inert to react in an alcoholysis or esterification reaction at a rate which makes the reaction of practical value.

We have discovered that although the alcoholysis method of preparing acrylic esters is slow when the alcohol used is isoproply alcohol, the simplest secondary alcohol, it is quite satisfactory for the preparation of the acrylic esters of higher secondary alcohols and can be used with moderate success even with isopropyl alcohol.

In order to achieve a satisfactory rate of alcoholysis and to cause the reaction to proceed virtually to completion, it is essential to remove the lower alcohol as it is liberated in the reaction, to use a suitable esterification catalyst, to use a suitable polymerization inhibitor and to use an excess of the lower acrylic ester. When these conditions are fulfilled, a very satisfactory rate of alcoholysis is obtained, in many instances being comparable to that obtained in alcoholysis with a primary alcohol.

In order better to illustrate the practice of our invention, the following examples are given:

EXAMPLE I

*Isopropyl acrylate*, $CH_2{:}CHCOOCH(CH_3)_2$ 2.0 moles (120 g.) of isopropanol, 6.0 moles (516 g.) of methyl acrylate, 15 g. of hydroquinone and 1 cc. of sulfuric acid were mixed and heated to boiling in a flask attached to a fractionating column. The column was operated under total reflux until the temperature at the still-head dropped to 62–63° C. The distillate was then drawn off very slowly, the temperature being kept below 64° C. This distillate consisted of the methanol-methyl acrylate azeotrope. When no more methanol was produced, the excess methyl acrylate was distilled, followed by the isopropyl acrylate. The latter boiled at 108–110° C. and had $N_D^{20}$, 1.4078 and $d_4^{20}$, 0.8936. The yield was 37 percent of the theoretical.

EXAMPLE II

*3-pentyl acrylate*, $CH_2{:}CHCOOCH(C_2H_5)_2$ 1.0 mole (88 g.) of 3-pentanol, 6.0 moles (516 g.) of methyl acrylate, 15 g. of hydroquinone and 1 cc. of sulfuric acid were caused to react as in Example I. The 3-pentyl acrylate was obtained in 83 percent yield, boiled at 63° C. at 27 mm. and had $N_D^{20}$, 1.4210 and $d_4^{20}$, 0.8883.

The acrylate readily polymerized in mass, in aqueous emulsion and in an organic solvent when warmed in the presence of a catalyst, such as an organic peroxide. The polymer was soft but tough and elastic. It was much stronger, tougher and less tacky than the polymer prepared from the isomeric n-amyl acrylate.

EXAMPLE III

*4-methyl-2-pentyl acrylate*, $CH_2{:}CHCOOCH(CH_3)CH_2CH(CH_3)_2$ 2.0 moles (204 g.) of 4-methyl-2-pentanol, 6.0 moles (516 g.) of methyl acrylate, 15 g. of hydroquinone and 1 cc. of sulfuric acid were treated as described in Example I. There was thus obtained a yield of 95 percent of the theoretical amount of 4-methyl-2-pentyl acrylate boiling at 71° C. at 29 mm. and having $N_D^{20}$, 1.4220 and $d_4^{20}$, 0.8723. The product readily polymerized as described in Example II to produce a strong, tough, elastic, rubbery polymer similar to polyethyl acrylate and much harder and tougher than that obtained from the isomeric n-hexyl acrylate.

EXAMPLE IV

*2-heptyl acrylate,*

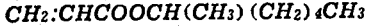
$CH_2{:}CHCOOCH(CH_3)(CH_2)_4CH_3$

By proceeding substantially as in Example I, there was obtained by the reaction of 1.0 mole (116 g.) of 2-heptanol, 3.0 moles (258 g.) of methyl acrylate, 10 g. of hydroquinone and 1 cc. of sulfuric acid, an 89 percent yield of 2-heptyl acrylate boiling at 66° C. at 5.7 mm. and having $N_D^{20}$, 1.4282 and $d_4^{20}$, 0.8750. Its polymer, prepared as described in Example II, was harder and less tacky than that prepared from n-heptyl acrylate.

EXAMPLE V

*2-octyl acrylate,*

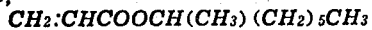
$CH_2{:}CHCOOCH(CH_3)(CH_2)_5CH_3$

By proceeding substantially as in Example I, 2-octyl acrylate was prepared in 80 percent yield from 2-octyl alcohol and methyl acrylate, using hydroquinone as a polymerization inhibitor and sulfuric acid as a catalyst.

The ester, which boiled at 79° C. at 5.4 mm. and had $N_D^{20}$, 1.4312 and $d_4^{20}$, 0.8754, readily polymerized as described in Example II to produce a soft, tacky, elastic polymer which, however, was harder and less tacky than the polymer of n-octyl acrylate.

EXAMPLE VI

*Cyclohexyl acrylate*

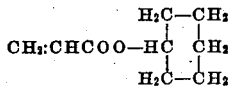

Cyclohexyl acrylate was prepared from cyclohexanol and methyl acrylate, using p-toluenesulfonic acid as a catalyst and hydroquinone as a polymerization inhibitor, the procedure being substantially the same as was described in Example I. The product was obtained in 93 percent yield as a liquid whose boiling point was 75° C. at 11 mm. and which had $N_D^{20}$, 1.4578 and $d_4^{20}$, 0.9742.

In marked contrast to n-hexyl acrylate, cyclohexyl acrylate produced a polymer which was tough, elastic, and non-tacky.

EXAMPLE VII

*p-methylcyclohexyl acrylate*

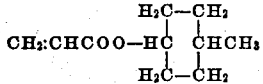

Similarly to the cyclohexyl ester described in Example VI, p-methylcyclohexyl acrylate was prepared in 81 percent yield. It boiled at 70° C. at 5.5 mm. pressure and had $N_D^{20}$, 1.4550 and $d_4^{20}$, 0.9528. Its polymer was similar to that of cyclohexyl acrylate.

EXAMPLE VIII

*Buten-1-yl-3 acrylate,*

$CH_2{:}CHCOOCH(CH_3)CH{:}CH_2$ 2.0 moles (144 g.) of buten-1-ol-3, 6.0 moles (516 g.) of methyl acrylate, 10 g. of phenylene diamine and 5 g. of aluminum tert.-butoxide were mixed and refluxed as in Example I. When no more methanol was produced, the mixture was fractionally distilled. The desired acrylate boiled at 71° C. at 97 mm. and had $N_D^{20}$, 1.4283 and $d_4^{20}$, 0.9120. The yield was 37 percent of the theoretical, some of the product being lost through polymerization.

From the examples described above, it is apparent that the alcoholysis method of preparing the acrylic esters of secondary alcohols produces very satisfactory yields and has a wide field of applicability. Thus, in addition to the particular alcohols used in the examples, various other alkyl, cycloalkyl, aralkyl, haloalkyl and olefinic secondary alcohols may be used. Also, in addition to the esters of acrylic acid, those of substituted acrylic acids such as methacrylic, ethacrylic, chloroacrylic and similar acids may be prepared by our process.

It will be understood by those skilled in the art that the details of the process may be varied considerably without departing from the spirit and scope of the invention. Thus, instead of the particular catalysts used in the above examples, other known esterification or ester interchange catalysts may be used, as for instance, other mineral acids, aryl sulfonic acids, metal alcoholates, and so forth. Likewise, other polymerization inhibitors may be used such as aryl amines, phenols, copper salts, sulfur, and so forth. Furthermore, other acrylic esters may be used as a starting material, as for instance, methyl or ethyl methacrylate, ethyl acrylate, methyl or ethyl esters of chloroacrylic acid, ethacrylic acid, and so forth. Also, the alcohol which is liberated in the reaction may be removed from the reaction mixture by other means, as for instance, by adding a suitable entraining agent, such as an aliphatic or aromatic hydrocarbon of suitable boiling point, to the reaction mixture and distilling the azeotrope.

The acrylic esters of secondary alcohols are especially valuable because they readily polymerize to produce resins which are harder, tougher, stronger and less tacky than the resins obtained by polymerizing the corresponding normal alkyl esters. This effect is enhanced still farther if the secondary alcohol has one or more branched chains in its molecular structure. By copolymerization with other suitable polymerizable compounds, very wide variation of the properties of the polymer may be achieved.

Having thus described our invention, we claim:

1. The process of preparing unsubstituted acrylic acid esters of secondary alcohols which comprises reacting a molar excess of a lower alkyl acrylate corresponding to the acrylic ester desired with a secondary noncyclic alcohol of the structure RCHOHR′ in which R and R′ are alkyl groups in the presence of an esterification catalyst and a polymerization inhibitor, and removing the resulting lower alcohol as it is formed during the reaction in the form of an azeotrope of the lower alcohol in the lower alkyl acrylate.

2. The process defined in claim 1 in which the lower alkyl acrylate is methyl acrylate.

3. The process defined in claim 1 in which the secondary alcohol corresponds to the formula: R—CHOH—R′, where R and R′ are alkyl radicals at least one of which has a branched chain.

4. A process as in claim 1 in which an aluminum alcoholate and an amine are used as catalytic and inhibiting agents, respectively.

5. The process of preparing unsubstituted acrylic acid esters of secondary alcohols which comprises reacting a molar excess of a lower alkyl acrylic acid ester corresponding to the acrylic ester desired with a secondary noncyclic alcohol having the general formula Alkyl—CHOH—R wherein R is selected from the group consisting of alkyl and alkenyl, in the presence of an esterification catalyst and a polymerization inhibitor, and removing the resulting lower alcohol as it is formed during the reaction in the form of an azeotrope of the lower alcohol and the lower alkyl acrylate.

6. The process as defined in claim 5 wherein the secondary alcohol has the general formula Alkyl—CHOH—Alkenyl 7. The process as defined in claim 1 wherein the secondary alcohol is 3-pentanol.

8. The process as defined in claim 1 wherein the secondary alcohol is 4-methyl-2-pentanol.

9. The process of preparing a secondary alcohol ester of unsubstituted acrylic acid which comprises reacting a mixture consisting of a lower alkyl ester of unsubstituted acrylic acid and a secondary non-cyclic alcohol in the molar ratio of about three of the ester to one of the alcohol, the latter being of the formula alkyl—CHOH—R, in which R is selected from the group consisting of alkyl and alkenyl, said mixture also containing an esterification catalyst and a polymerization inhibitor, and distilling off an azeotropic mixture of the resulting lower alcohol and the said lower alkyl ester, as the lower alcohol is formed in the reaction.

10. The process described in claim 9 in which the lower alkyl ester is methyl acrylate and the secondary non-cyclic alcohol is 3-pentanol.

11. The process described in claim 9 in which the lower alkyl ester is methyl acrylate and the secondary non-cyclic alcohol is 4-methyl-2-pentanol.

CHESSIE E. REHBERG.
CHARLES H. FISHER.

REFERENCES CITED

The following references are of record in the file of this patent:

UNITED STATES PATENTS

| Number | Name | Date |
|---|---|---|
| 2,117,349 | Neher | May 17, 1938 |
| 2,122,716 | Graves | July 5, 1938 |
| 2,129,663 | Barrett | Sept. 13, 1938 |
| 2,129,666 | Barrett et al. | Sept. 13, 1938 |
| 2,138,763 | Graves | Nov. 29, 1938 |
| 2,251,765 | Sorenson | Aug. 5, 1941 |

OTHER REFERENCES

Rule et al., "Jour. Chem. Soc." (London) (1929), page 2274.